United States Patent [19]

Tunoda et al.

[11] Patent Number: 4,735,375
[45] Date of Patent: Apr. 5, 1988

[54] DRAG DEVICE FOR A SPINNING REEL

[75] Inventors: Kikuo Tunoda; Kenji Maruyama, both of Hiroshima, Japan

[73] Assignee: Ryobi Ltd., Fuchu, Japan

[21] Appl. No.: 875,689

[22] Filed: Jun. 18, 1986

[30] Foreign Application Priority Data

Jun. 19, 1985 [JP] Japan .................. 60-93188[U]

[51] Int. Cl.⁴ .................. A01K 89/00; A01K 89/02
[52] U.S. Cl. .................. 242/84.5 A; 242/84.21 R
[58] Field of Search .................. 242/84.21 R, 84.5 R, 242/84.5 A, 84.51 R, 84.51 A, 217, 218, 219

[56] References Cited

U.S. PATENT DOCUMENTS

| 2,783,952 | 3/1957 | Clay | 242/84.5 A |
| 2,925,229 | 2/1960 | Wood | 242/84.5 R |
| 3,254,861 | 6/1966 | Jahn | 242/84.51 A |
| 3,993,267 | 11/1976 | Murvall | 242/217 |
| 4,077,582 | 3/1978 | Way | 242/84.5 R |

Primary Examiner—Stuart S. Levy
Assistant Examiner—Lynn M. Sohacki
Attorney, Agent, or Firm—Finnegan, Henderson, Farabow, Garrett and Dunner

[57] ABSTRACT

A drag device for a fishing reel having a heat conductive plate for conducting heat generated from the friction between the drag washers to the surrounding atmosphere wherein the heat conductive plate is attached to the front of a rotatable spool between the spool and the drag washers.

4 Claims, 1 Drawing Sheet

DRAG DEVICE FOR A SPINNING REEL

CROSS-REFERENCE TO RELATED PATENT APPLICATION

The patent application is related to U.S. patent application, Ser. No. 878,041, filed June 24, 1986.

BACKGROUND OF THE INVENTION

1. Field of the Invention

The present invention relates to a drag device for a reel used for fishing.

2. Description of the Related Art

In a conventional drag device for a spinning reel, a drag washer is provided in the front recess of a spool, and a drag knob screwed to a spool shaft is used to push the drag washer against the bottom surface of the recess to apply a desired tightening force to the spool. Because the drag washer is pushed directly against the spool, which is made of a plastic material having a low thermal conductivity, frictional heat generated on the friction surfaces of the spool and drag washer does not dissipate but rather stays in these members causing the drag washer spool and drag knob to deform. The drag washer, made of metal, is pushed against the bottom surface of the recess of the spool which is roughened to increase the frictional resistance between the drag washer and the spool. For that reason, even if the drag knob is slightly turned, the tightening force on the spool is greatly changed so that the drag cannot be finely adjusted. Furthermore, the spool and the drag knob are likely to crack due to thermal fluctuations caused by the frictional heat.

SUMMARY OF THE INVENTION

The present invention was designed to solve the above-mentioned problems.

It is an object of the present invention to provide a drag device in which a metal heat radiation plate is fitted between a plastic spool and drag washers provided in the recess of the spool, so that frictional heat generated on the friction surfaces of the drag washers is conducted through the heat radiation plate and thus dissipated. For that reason, the temperature of these members is kept from getting too high which allows stable slipping and fine adjustment of the drag for a long period of time.

According to the present invention, the metal heat radiation plate, only rotationally supported on a spool shaft, is fitted between the plastic spool and the plurality of drag washers provided in the recess of the front of the spool to solve the above-mentioned problems.

When one drag washer is rotated together with the spool by the pulling force of a hooked fish, frictional heat is generated on the friction surfaces of both drag washers. The frictional heat is conducted through the heat radiation plate fitted between the drag washer and the spool so that the heat is dissipated. Because the temperature of these members is kept from getting too high, the members will not deform and slipping between the drag washers will not be adversely affected.

Because one drag washer is not directly pushed against the spool, but rather, onto another drag washer fitted on the front of the heat radiation plate, rotates together with the spool, slipping under stable drag conditions can be achieved. For that reason, the drag of the device can be finely adjusted. Furthermore, the tightening force on the spool can be increased.

DESCRIPTION OF THE PREFERRED EMBODIMENT

Figure 1:
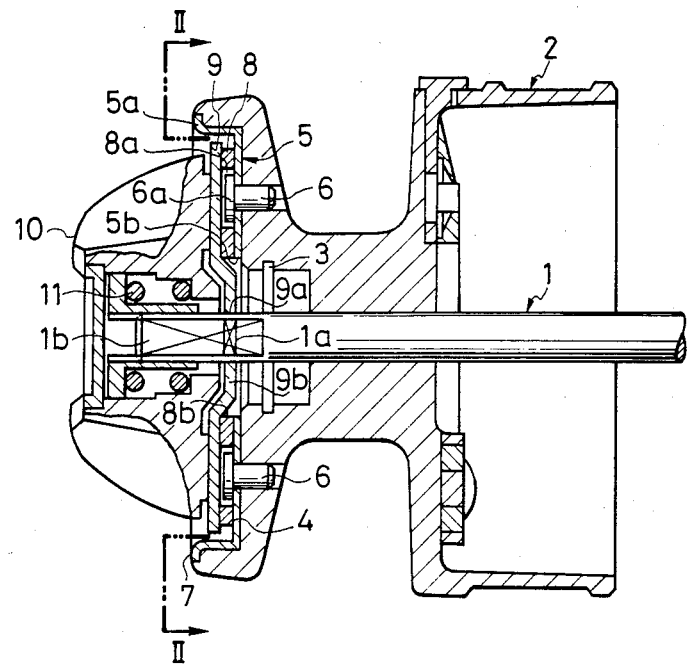
FIG. 1 shows a sectional view of a drag device for a spinning reel, which is an embodiment of the present invention.
Figure 2:
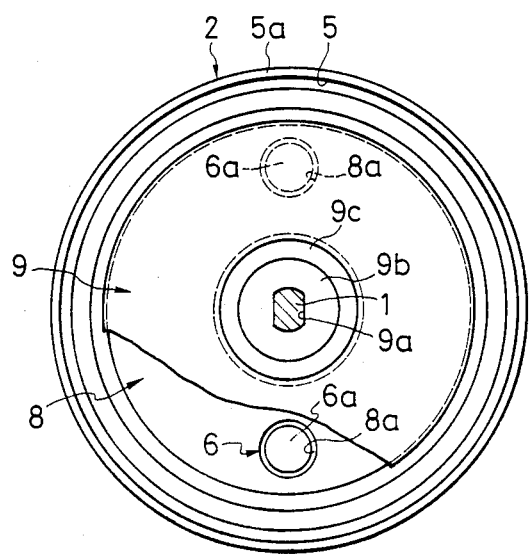
FIG. 2 shows a cross-sectional view taken along arrows II—II in FIG. 1.

An embodiment of the present invention is now described in detail with reference to the drawings. FIGS. 1 and 2 show spool shaft 1 supported on the body of a reel (not shown) so that the spool shaft cannot be rotated but can be slid back and forth in the axial direction. Spool 2 is rotatably fitted on spool shaft 1 so that axial movement of spool 2 on spool shaft 1 is restricted by stop ring 3.

Heat radiation plate 5 is fitted in recess 4 of the front of spool 2 and secured by attachment means such as rivets 6. Heat radiation plate 5 has a protruded peripheral edge 5a bent outwardly and fitted in annular recess 7 provided at the outer edge of recess 4, so that the area of contact by the heat radiation plate 5 with the atmosphere is maximized. Heat radiation plate 5 is constructed from a high thermally conductive metal such as aluminum.

Two drag washers 8 and 9 made from a friction material are provided in recess 4 and placed in contact with each other on the front of heat radiation plate 5. Drag washer 8, located in contact with heat radiation plate 5, has holes 8a in which heads 6a of rivets 6 are fitted to place drag washer 8 on the front of heat radiation plate 5 to rotate drag washer 8 together with spool 2 and heat radiation plate 5.

The cross section of that portion 1a of spool shaft 1, projecting forwardly from spool 2, can be optionally shaped as a notched circle, a polygon or the like. Hole 9a, whose shape corresponds to that of the cross section of the portion 1a, is provided in the central portion of outer drag washer 9. Spool shaft 1 is fitted in hole 9a of drag washer 9 so that drag washer 9 cannot be rotated relative to spool shaft 1.

Drag knob 10 is screwed to the threaded tip portion 1b of spool shaft 1 so that the drag knob can be spirally moved back and forth by the force of spring 11. The drag knob 10 can be turned to push drag washer 9 on the other drag washer 8 toward spool 2 to variably adjust the frictional force between two drag washers 8 and 9.

Large diameter holes 5b and 8b are provided in the central portions of heat radiation plate 5 and drag washer 8, respectively, so that the heat radiation plate and the drag washer are annularly shaped. The central portion of the other drag washer 9 protrudes towards the back or right as shown in FIG. 1 so that the central portion has a projection 9b located around hole 9a of washer 9 and peripheral annular slope 9c. Projection 9b is fitted through holes 8b and 5b of drag washer 8 and heat radiation plate 5, respectively. As a result, drag knob 10 pushes only that peripheral portion of drag washer 9 contacting drag washer 8.

When drag knob 10 is turned so that it spirally moves relative to spool shaft 1, the drag knob pushes drag washer 9 against drag washer 8 by the resilient force of spring 11.

Drag washer 8 rotates together with spool 2, while drag washer 9 remains fixed on spool shaft 1. For that reason, when drag washer 8 rotates together with spool 2 by the pulling force of a hooked fish, both drag washers 8 and 9 frictionally slip on each other. The frictional force between washers 8 and 9 can be variably set at any magnitude by spirally moving drag knob 10 back or forth.

When drag washers 8 and 9 slip on each other, frictional heat is generated between the friction surfaces of the washers. The frictional heat is conductive through metal heat radiation plate 5 having high thermal conductivity causing the heat to dissipate.

Therefore, the temperature of drag washers 8 and 9, spool 2 and drag knob 10 does not get too high.

The present invention has been disclosed in terms of preferred embodiments. The invention is not limited thereto and is defined by the appended claims and their equivalents.

What is claimed is:

1. A drag device for a spinning reel comprising:
   a spool shaft;
   a spool rotatably fitted on said spool shaft, said spool having a first recess formed therein;
   a plurality of drag washers located in said first recess each of said drag washers having contacting friction surfaces;
   a drag knob secured to an end of said spool shaft for pushing the surface of one of said drag washers against the surface of another of said drag washers for creating a drag force;
   a heat radiation plate between said spool and said drag washers for conducting and dissipating heat produced by friction between the friction surfaces of said drag washers to the surrounding atmosphere; and
   wherein said spool includes a second annular recess spaced radially outwardly from said first recess, said heat radiation plate having a protruding peripheral edge within said second annular recess for maximizing the contact area of said heat radiation plate with the surrounding atmosphere.

2. A drag device as set forth in claim 1, wherein one of said drag washers is fixed on said spool shaft and another of said drag washers rotating with said spool.

3. A drag device as set forth in claim 1, wherein said heat radiation plate is secured to said spool by attachment means.

4. A drag device as set forth in claim 3, wherein said attachment means comprise plurality of rivets having heads and said drag washer rotating with said spool having at least one hole therein, at least one of said rivet heads engaging said hole to rotate said drag washer engaged thereon.

* * * * *